Nov. 7, 1939.        J. H. MILLER         2,179,048
                     TESTING DEVICE
                   Filed Feb. 27, 1937
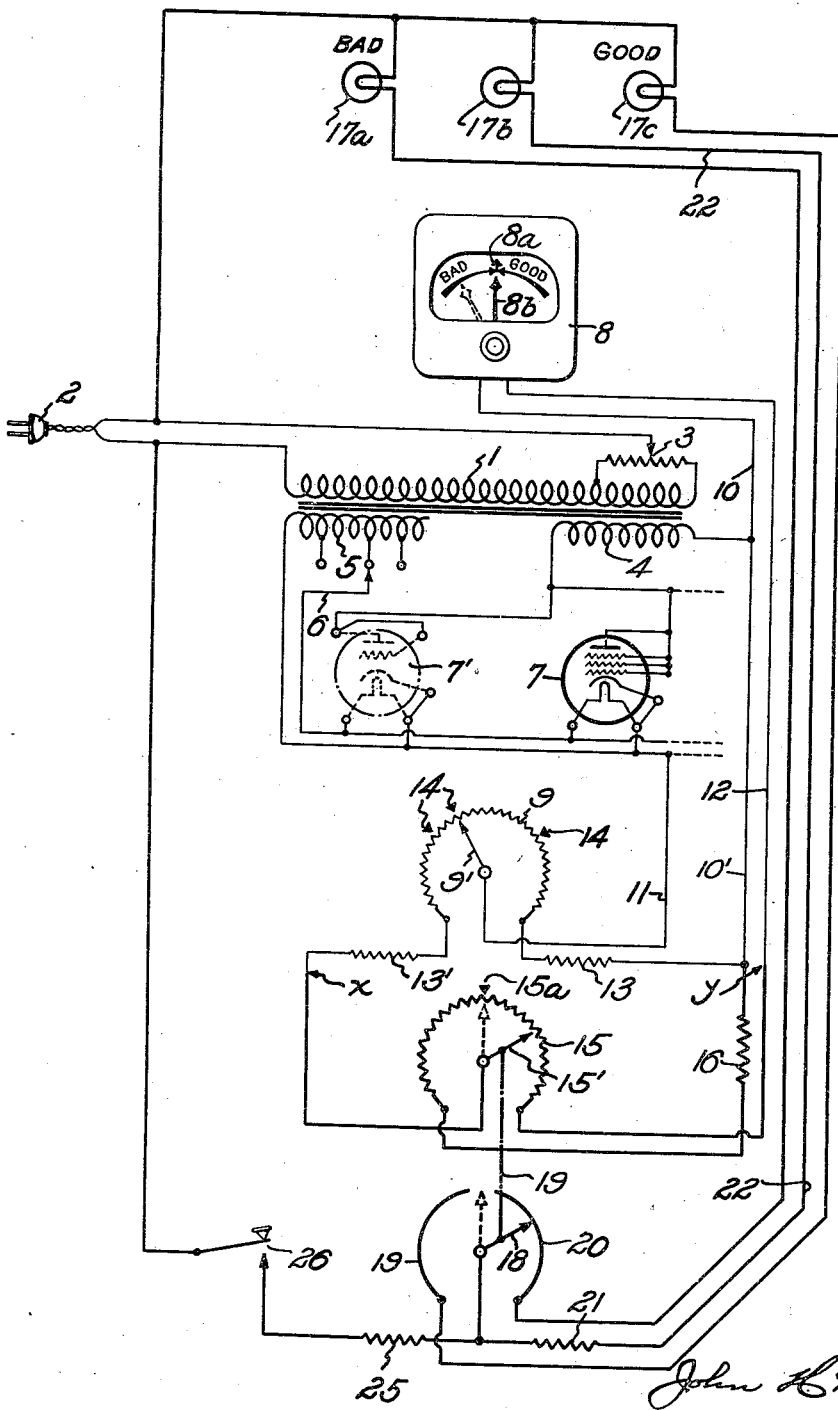
Inventor:
John H. Miller,
By Potter, Pierce & Scheffler,
Attorneys.

Patented Nov. 7, 1939

2,179,048

UNITED STATES PATENT OFFICE 2,179,048

TESTING DEVICE

John H. Miller, Short Hills, N. J., assignor to Weston Electrical Instrument Corporation, Newark, N. J., a corporation of New Jersey Application February 27, 1937, Serial No. 128,265

2 Claims. (Cl. 250—27)

This invention relates to testing devices and more particularly to devices for measuring a characteristic of a piece of equipment, such devices including an electrical measuring instrument and auxiliary signal elements, such as lamps, for indicating whether or not the piece of equipment falls within, or above or below, the required test limits.

It has been proposed to associate a manually operated signal system with a measuring instrument. Such arrangements are open to the objection that the operator, either deliberately or through error, may throw the wrong switch after reading the measuring instrument and thus produce a false signal indication. A signal circuit may be automatically controlled by the measuring instrument, but such an arrangement is expensive as it calls for a plurality of sensitive relays and auxiliary relays.

An object of this invention is to provide a simple and inexpensive testing device which includes an electrical measuring instrument, an adjustable network for controlling the sensitivity of the instrument, and a plurality of indicating devices having energizing circuits selectively controlled by the adjustment of the network. An object is to provide a tube tester of the type including a measuring instrument, indicating devices, switch mechanism for the indicating devices, and an adjustable device for controlling the sensitivity of the instrument and the switch mechanism in such manner that the indicating devices are selectively energized in accordance with the merit or value of a tube under test. More specifically, an object of the invention is to provide a tube tester of the so-called emission type, which tester includes a measuring instrument and a potentiometer for adjusting the sensitivity of the instrument in accordance with the type of tube to be tested; the tester also including signal devices, preferably lamps, and a control switch mechanism for the signal devices in the form of a combined potentiometer and switch, the appropriate signal device being energized to indicate the relative merit of a tube under test by adjusting the control switch mechanism to bring the pointer of the instrument to a predetermined point.

These and other objects and advantages of the invention will be apparent from the following specification when taken with the accompanying drawing in which the single view is a fragmentary circuit diagram of an embodiment of the invention.

Apparatus for the testing of tubes by measurement of emission or total emission are well known and, preferably, the present invention is incorporated in a tube tester of that type. Such equipment includes, in general, a source of power in the form of a transformer having a primary winding 1 with leads connected to a plug 2 that may be plugged into the usual alternating current supply line; a voltage adjusting resistance 3 being preferably included for regulating to standard conditions. The transformer has a secondary winding 4 for supplying plate current to tubes under test and a tapped secondary 5 for supplying filament or heater voltages of different values. The tap connection 6 of the winding 5 extends to a plurality of sockets for receiving tubes 7, 7' of different types and, as indicated in the drawing, the tube 7 is under test. The socket terminals are so connected that the plate and all grids of the tube are connected in parallel to the winding 4 to develop the total emission of the tube.

The measuring circuit for indicating the value of the tube under test includes a milliammeter 8 and a potentiometer 9 for adjusting the sensitivity of the ammeter. According to one known arrangement, the positive terminal of the milliammeter 8 was connected to one side of the plate circuit winding 4 of the power supply by a lead 10, the adjustable tap 9' of the potentiometer was connected to the common cathode lead of the several tube sockets by a lead 11, and the resistance element of the potentiometer was shunted across the milliammeter. This shunt circuit included a lead 10' connecting the positive terminal of the instrument to one end of the potentiometer, and a lead 12 from the negative terminal of the instrument to the other end of the potentiometer. Fixed resistors 13, 13' could be and usually were included in these connections. The described connections, according to the prior practice, were made by a direct connection between the indicated point $x$, at one side of the potentiometer 9, and the point $y$ on the lead 12.

The potentiometer 9 was provided with a series of fiducial marks 14 which indicated the position to which the tap 9' should be set for the testing of different types of tubes. The scale of the instrument 8 was provided with an index mark 8a with which the pointer 8b would aline if the tube under test exhibited a minimum acceptable emission, i. e. was at the lower limit of its useful life. The method of testing a tube comprised the setting of the tap 9' to the appropriate fiducial mark, and the reading of the instrument 8. If the pointer 8b was displaced beyond the index 8a, the tube had a value or useful life that was measured, in general, by the angular displacement of the pointer beyond the index 8a. If the pointer did not reach the index 8a, the tube was unsatisfactory. The scale was usually marked with the legends "Good" and "Bad" at opposite sides of the index mark 8a.

The essential circuits of the prior devices are shown in light lines in the drawing, and the additional circuit elements of the indicating system of this invention are shown in heavy lines. The invention comprises, in general, the addition of a second potentiometer for controlling the sensitivity of the measuring instrument, and a switch system mechanically connected to the adjustable arm of the second potentiometer for controlling the indicating devices.

According to this invention, the resistor of the second potentiometer 15 is connected between point y on lead 12 and the lead 10', and the adjustable tap 15' of this potentiometer 15 is connected to the point x which, through fixed resistor 13', is connected to one end of the main potentiometer 9. An index mark 15a designates a normal setting for tap 15' at which the second potentiometer has no effect upon the control of the ammeter sensitivity by the main potentiometer 9. This condition is obtained either by locating the fiducial marks 14 of potentiometer 9 in new positions or by selecting new values for resistors 13 and/or 13' to compensate for the changed sensitivity due to the addition of the second potentiometer. The rate of change of the instrument sensitivity for an angular adjustment of the tap 15' is determined by the relative values of potentiometer 15 and its series resistor 16.

A plurality of indicating devices 17a, 17b, 17c, preferably small light bulbs, have one terminal connected to the current source or plug 2, and the opposite terminals of the indicating devices are connected to a switch system that is mechanically connected to the potentiometer 15. The switch system includes a contact arm 18 that is mechanically connected to the tap 15' of potentiometer 15, and a pair of contact elements 19, 20 that are positioned for engagement by the arm 18 when the potentiometer contact arm 15' is displaced to one side or the other of its normal or ineffective position in alinement with the index mark 15a. The switch mechanism may take the physical form of a potentiometer with the contact arm 18 secured to the shaft of potentiometer 15, the contacts 19, 20 being low resistance windings separated by a small gap. The contact arm 18 of the switch assembly is connected through a resistor 21 and lead 22 to the indicating device 17b, and contact elements 19 and 20 are connected by leads 23, 24, respectively, to the indicating devices 17c and 17a. The contact arm 18 is also connected, through a voltage reducing resistor 25 and a manually operable switch 26 to the other side of the current source or plug 2.

Different types of tubes may be tested by first setting the movable arm 9' of the primary potentiometer to the index 14 that is designated for that type of tube, and setting the movable contact 15' of the second potentiometer to the index mark 15a. As shown in the drawing, the tube 7 is being tested, and the measured indication of the total emission resulted in a displacement of the instrument pointer 8b into the dotted line position. This tube was defective since the total emission was below the accepted value for that type of tube. The visual indication of the value of the tube in accordance with the invention was obtained by the following operations. The tap 15' of the second potentiometer was adjusted into the illustrated solid line position to adjust the sensitivity of the measuring instrument to bring the pointer 8b into line with the index mark 8a. This increase in the sensitivity of the instrument was automatically accompanied by a movement of the switch arm 18 into engagement with the contact element 20. A closure of switch 26 at this adjustment of the potentiometers will complete the circuit of lamp 17a to afford a visual indication that the tube is defective. An acceptable tube will show a relatively high emission and the pointer 8b of instrument 8 will be displaced into the "Good" section of the scale. The subsequent adjustment of the second potentiometer 15 to bring the instrument reading back to index mark 8a will necessitate a reduction in instrument sensitivity by the potentiometer 15, i. e. a counterclockwise adjustment of arm 15' from its normal position. The switch arm 18 will thus be moved into engagement with the contact element 19 and, upon closing switch 26, the indicating lamp 17c will be energized.

Legends such as "Bad" and "Good" may be placed on lenses or transparent plates arranged in front of the lamps 17a and 17c, respectively, and these lamps may be, and preferably are, small low voltage lamps. It will be apparent that the resistance 21 in series with the minimum acceptable value lamp 17b will prevent the lighting of that lamp when a direct connection is established to lamp 17a or lamp 17c. A three-way indication is thus obtained with a switch system which has an off and alternative closed circuit positions.

It is to be understood that the invention will usually be incorporated in a more elaborate circuit arrangement for the testing of tubes for other characteristics than total emission but, for simplicity of explanation, only the essential circuit arrangements of the indicating system of this invention have been illustrated and described. The physical construction and the design of circuit elements for practicing the invention are subject to wide variation within the spirit of my invention as set forth in the following claims.

I claim:

1. In a tube testing device, the combination with means for energizing a tube, a measuring instrument, means connecting said instrument to the tube to indicate a characteristic of the tube, and a potentiometer for adjusting the sensitivity of said instrument, of a second potentiometer in circuit with said first potentiometer, said second potentiometer having a normal intermediate position for the adjustable tap thereof, a series of three indicating lamps corresponding to the minimum acceptable value for a tube and to values above and below the same, a source of current for energizing said lamps, a permanently connected circuit including a resistance between said source and the lamp indicating minimum acceptable value, and switch mechanism for controlling the energization of said lamps, said mechanism including a contact for each of the other lamps and a contact arm mechanically connected to the second potentiometer, said contact arm being positioned between said contacts when said second potentiometer stands in normal position.

2. In a tube testing device, the combination with means for energizing a tube, a measuring instrument for indicating the emission current of the tube, and a potentiometer for adjusting the sensitivity of said instrument, of a second potentiometer in circuit with said first potentiometer, said second potentiometer having a normal intermediate position for the adjustable tap thereof, a series of three indicating lamps corresponding to the minimum acceptable value for a tube and to values above and below the same, a source of current for energizing said lamps, a permanently connected circuit including a resistance between said source and the lamp indicating minimum acceptable value, and switch mechanism for controlling the energization of said lamps, said mechanism including a contact for each of the other lamps and a contact arm mechanically connected to the second potentiometer, said contact arm being positioned between said contacts when said second potentiometer stands in normal position.

JOHN H. MILLER.